(12) United States Patent
Mizoo

(10) Patent No.: US 11,597,365 B2
(45) Date of Patent: Mar. 7, 2023

(54) VEHICLE CONTROL SYSTEM

(71) Applicant: TOYOTA JIDOSHA KABUSHIKI KAISHA, Toyota (JP)

(72) Inventor: Shun Mizoo, Zama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 179 days.

(21) Appl. No.: 17/136,717

(22) Filed: Dec. 29, 2020

(65) Prior Publication Data
US 2021/0284112 A1 Sep. 16, 2021

(30) Foreign Application Priority Data
Mar. 12, 2020 (JP) .............................. JP2020-043301

(51) Int. Cl.
| | |
|---|---|
| *B60T 8/1761* | (2006.01) |
| *B60W 30/16* | (2020.01) |
| *B60W 30/17* | (2020.01) |
| *B60T 8/172* | (2006.01) |

(52) U.S. Cl.
CPC .......... *B60T 8/17616* (2013.01); *B60T 8/172* (2013.01); *B60W 30/162* (2013.01); *B60W 30/17* (2013.01)

(58) Field of Classification Search
CPC .. B60T 8/17616; B60T 8/172; B60W 30/162; B60W 30/17
See application file for complete search history.

(56) References Cited

U.S. PATENT DOCUMENTS

| | | | |
|---|---|---|---|
| 10,589,738 B1 * | 3/2020 | Boecker | B60W 10/18 |
| 2005/0107955 A1 | 5/2005 | Isaji et al. | |
| 2006/0025918 A1 | 2/2006 | Saeki | |

FOREIGN PATENT DOCUMENTS

| | | | |
|---|---|---|---|
| JP | 2005-149021 A | 6/2005 | |
| JP | 2006-315491 A | 11/2006 | |
| JP | 4172434 B2 | 10/2008 | |
| JP | 2014-148293 A | 8/2014 | |
| JP | 2019-077341 A | 5/2019 | |

* cited by examiner

*Primary Examiner* — Nicholas Kiswanto
*Assistant Examiner* — Jamal A Shah
(74) *Attorney, Agent, or Firm* — Sughrue Mion, PLLC

(57) ABSTRACT

A vehicle control system is configured to, when anti-skid control is started in a situation in which driving support control is being executed, execute a specific process for making a stop condition of the anti-skid control difficult to be satisfied as compared to when the driving support control is not being executed.

5 Claims, 7 Drawing Sheets

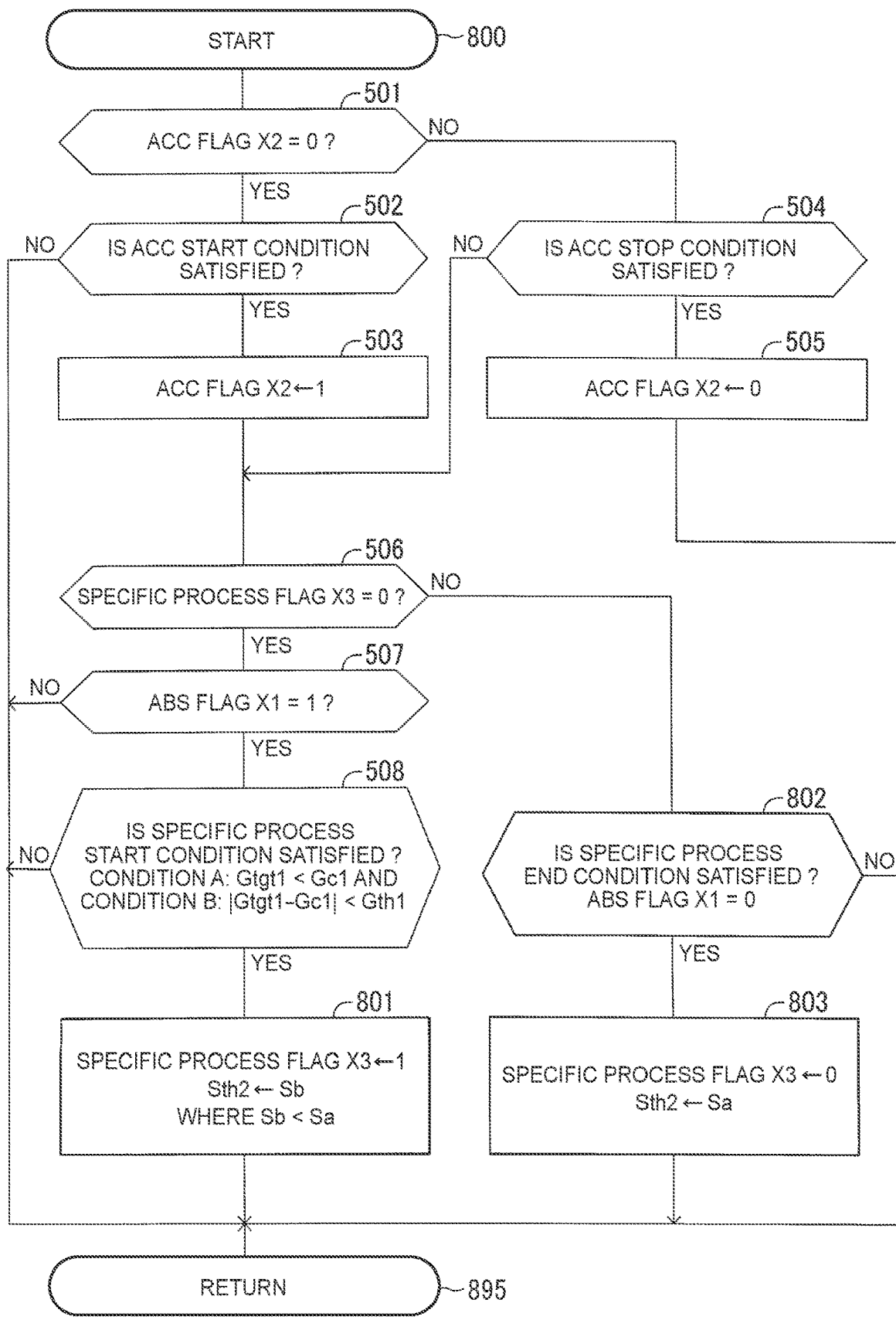

VEHICLE CONTROL SYSTEM

CROSS-REFERENCE TO RELATED APPLICATION

This application claims priority to Japanese Patent Application No. 2020-043301 filed on Mar. 12, 2020, incorporated herein by reference in its entirety.

BACKGROUND

1. Technical Field

The disclosure relates to a vehicle control system capable of executing anti-skid control.

2. Description of Related Art

Anti-skid control (anti-lock brake control) that have been widely adopted so far is control to release locking up of each wheel during braking of a vehicle (hereinafter, simply referred to as ABS).

There is a known vehicle control system that executes acceleration control to control the acceleration of a vehicle without the need to operate an accelerator pedal and a brake pedal. Adaptive cruise control (hereinafter, simply referred to as ACC) is an example of such acceleration control. In recent years, development of a vehicle control system that executes autonomous driving control to autonomously control the acceleration, steering angle, and the like of a vehicle has been proceeding. Hereinafter, control to assist in part or all of the drive of a vehicle, such as ACC and autonomous driving control, is referred to as driving support control.

One of existing vehicle control systems that execute driving support control reduces a control gain in feedback control that is executed in driving support control when ABS is started during execution of the driving support control (see, for example, Japanese Unexamined Patent Application Publication No. 2019-077341 (JP 2019-077341 A)). Thus, the influence of driving support control on the locked state of a wheel reduces, so it is possible to further appropriately release the locking up of the wheel with ABS.

SUMMARY

Incidentally, it is assumed that ABS is started during execution of driving support control. As a result, the locking up of a wheel is released, and ABS stops. However, just after ABS stops, a road surface coefficient of friction $\mu$ of a road surface on which a vehicle is running may change. Hereinafter, the road surface coefficient of friction $\mu$ is simply referred to as road surface $\mu$. When, for example, the road surface $\mu$ reduces, a wheel locks up again after ABS stops, with the result that ABS is started again. In this way, when ABS is repeatedly executed in a relatively short period of time, the behavior of the vehicle may become unstable.

The disclosure provides a vehicle control system configured to execute a specific process such that, when ABS is started during execution of driving support control, ABS is difficult to stop.

In one or more embodiments, a vehicle control system includes a drive device configured to generate a driving force for driving part or all of a plurality of wheels, a braking device capable of applying a braking force to each of the plurality of wheels, an information acquisition device configured to acquire vehicle surrounding information that is information on a situation around a vehicle, and a controller configured to execute driving support control to compute a target acceleration based on the vehicle surrounding information and change an acceleration of the vehicle by using at least one of the drive device and the braking device such that an actual acceleration of the vehicle coincides with the target acceleration, and anti-skid control to, when at least one specific wheel of the plurality of wheels locks up in a situation in which the braking force is being applied to the plurality of wheels by the braking device, adjust the braking force applied to the at least one specific wheel by using the braking device such that the locking up of the at least one specific wheel is eliminated. The controller is configured to, when a start condition including a condition that a slip relevant value indicating a degree of slip of the at least one specific wheel is greater than a predetermined start threshold is satisfied, start the anti-skid control on the at least one specific wheel, and, after starting the anti-skid control, when a stop condition including a condition that the slip relevant value of the at least one specific wheel is less than a predetermined stop threshold value is satisfied, stop the anti-skid control. The controller is configured to, when the anti-skid control is started in a situation in which the driving support control is being executed, execute a specific process for making the stop condition difficult to be satisfied as compared to when the anti-skid control is started in a situation in which the driving support control is not being executed.

With this configuration, when the anti-skid control is started in a situation in which the driving support control is being executed, the anti-skid control is difficult to stop. In other words, the start and stop of ABS are not repeated. Therefore, it is possible to reduce the possibility that the behavior of the vehicle becomes unstable.

In the vehicle control system according to one or more embodiments, the controller may be configured to execute a process of controlling the braking device based on a target deceleration that is an acceleration obtained by reducing the target acceleration by a predetermined amount, as the specific process.

With this configuration, the braking device is controlled based on the target deceleration less than the limit deceleration, so the slip relevant value is difficult to be less than the stop threshold. Therefore, it is possible to increase the possibility that the anti-skid control is continuously executed without interruption.

In the vehicle control system according to one or more embodiments, the controller may be configured to, from when the specific process is started, estimate a limit deceleration that is a limit value of an available negative acceleration on a road surface on which the vehicle is running, and, when the target deceleration exceeds the limit deceleration, stop the specific process.

With this configuration, it is possible to stop the specific process by using the relation between the target deceleration, used in the specific process, and the limit deceleration.

In the vehicle control system according to one or more embodiments, the controller may be configured to, from when the specific process is started, estimate a limit deceleration that is a limit value of an available negative acceleration on a road surface on which the vehicle is running, and, when the target deceleration exceeds a value greater by a predetermined value than the limit deceleration, stop the specific process.

With this configuration, after the anti-skid control is stopped, the specific process is continued according to the magnitude of the predetermined value. It is possible to start the anti-skid control at early timing in a situation in which at least one wheel is likely to lock up again.

In the vehicle control system according to one or more embodiments, the controller may be configured to execute a process of setting the stop threshold such that the stop threshold that is used when the driving support control is being executed is less than the stop threshold that is used when the driving support control is not being executed, as the specific process.

With this configuration, the slip relevant value is difficult to be less than the stop threshold in a situation in which the driving support control is being executed. Therefore, it is possible to increase the possibility that the anti-skid control is continuously executed without interruption.

In the vehicle control system according to one or more embodiments, the controller may be configured to, after when the anti-skid control is started, estimate a limit deceleration that is a limit value of an available negative acceleration on a road surface on which the vehicle is running, and the controller may be configured to, when the target acceleration is less than the limit deceleration and a magnitude of a difference between the target acceleration and the limit deceleration is less than a predetermined first threshold, start the specific process.

When the magnitude of the difference is small, there is a high possibility that the start and stop of the anti-skid control are repeated due to a change in road surface μ. With the above configuration, it is possible to start the specific process in such a situation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing an ACC start/stop routine that is executed by a CPU of a driving support ECU according to the modification.

DETAILED DESCRIPTION OF EMBODIMENTS

Configuration

Figure 1:
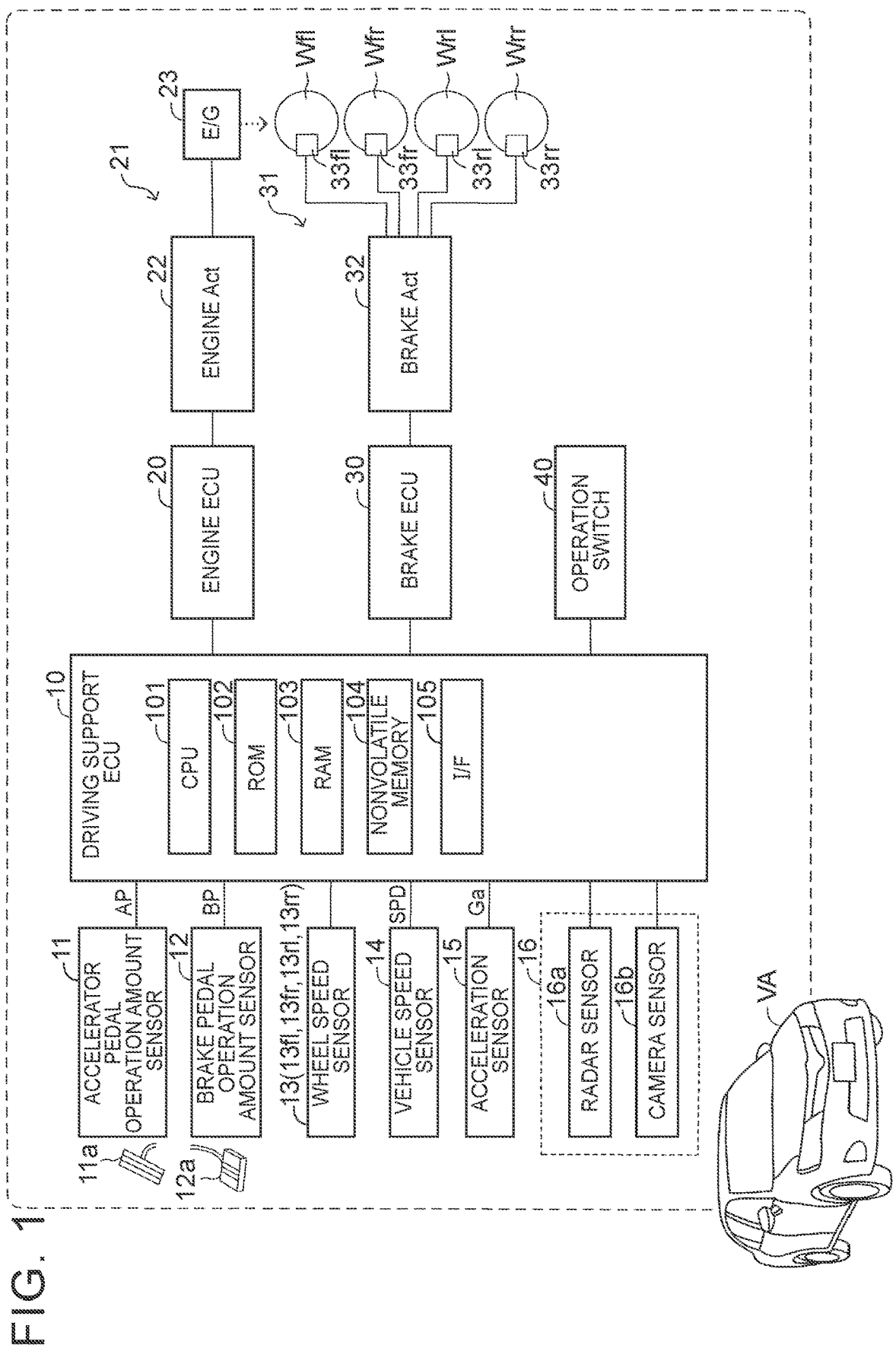
FIG. 1 is a schematic configuration diagram of a vehicle control system according to one or more embodiments.

A vehicle control system according to the present embodiment is applied to a vehicle VA as shown in FIG. 1. The vehicle control system includes a driving support ECU 10, an engine ECU 20, and a brake ECU 30. These ECUs are electric control units each including a microcomputer as a main component and are connected so as to be capable of sending and receiving information to one another via a controller area network (CAN) (not shown). Two or more ECUs of the above-described ECUs may be integrated into a single ECU.

In the specification, the microcomputer includes a CPU, ROM, RAM, nonvolatile memory, an interface (I/F), and the like. For example, the driving support ECU 10 includes a CPU 101, ROM 102, RAM 103, nonvolatile memory 104, an interface 105, and the like. The CPU is configured to implement various functions by running instructions (programs and routines) stored in the ROM.

The driving support ECU 10 is connected to the sensors listed below and is configured to receive detection signals or output signals of those sensors. Each sensor may be connected to an ECU other than the driving support ECU 10. In this case, the driving support ECU 10 receives a detection signal or output signal of a sensor via the CAN from the ECU connected to the sensor.

An accelerator pedal operation amount sensor 11 detects an operation amount of an accelerator pedal 11a (that is, an accelerator operation amount) and outputs a signal indicating an accelerator pedal operation amount AP. A brake pedal operation amount sensor 12 detects an operation amount of a brake pedal 12a and outputs a signal indicating a brake pedal operation amount BP.

Wheel speed sensors 13 (13fr, 13fl, 13rr, 13rl) output signals respectively indicating the rotational angular velocities of a right front wheel Wfr, a left front wheel Wfl, a right rear wheel Wrr, and a left rear wheel Wrl. In the specification, the alphabet suffixes assigned to reference numerals denote with which wheels component elements are associated. The suffix "fr" corresponds to the right front wheel, the suffix "fl" corresponds to the left front wheel, the suffix "rr" corresponds to the right rear wheel, and the suffix "rl" corresponds to the left rear wheel. When fr, fl, rr, and rl do not need to be distinguished from one another, the suffix "**" is assigned to reference numerals.

A vehicle speed sensor 14 detects the travel speed (vehicle speed) of the vehicle VA and outputs a signal indicating the vehicle speed SPD. An acceleration sensor 15 detects the acceleration of the vehicle VA in the front-rear direction and outputs a signal indicating the detected acceleration Ga.

A surrounding sensor 16 is a sensor that detects a situation around the vehicle VA. The surrounding sensor 16 acquires information on a road around the vehicle VA (for example, a driving lane on which the vehicle VA is running) and information on three-dimensional objects on the road. The three-dimensional objects include, for example, moving objects, such as pedestrians, four-wheel vehicles, and two-wheel vehicles, and fixed objects, such as guard rails and fences. Hereinafter, these three-dimensional objects are referred to as targets. The surrounding sensor 16 includes a radar sensor 16a and a camera sensor 16b.

The radar sensor 16a, for example, emits millimeter wave-band radio waves (hereinafter, referred to as millimeter waves) to a surrounding area including at least an area ahead of the vehicle and receives millimeter waves reflected by targets present in a radiated range (that is, reflected waves). The radar sensor 16a determines whether there is a target and computes information indicating a relative relation between the vehicle and the target. Information indicating a relative relation between the vehicle and the target includes a distance Dfx(n) between the vehicle VA and a target n, a relative velocity Vfx(n) of the target n to the vehicle VA, the direction (or location) of the target n to the vehicle VA, and the like. Information obtained from the surrounding sensor 16 (including information indicating a relative relation between the vehicle and the target) is referred to as target information.

The camera sensor 16b acquires image data by capturing a landscape ahead of the vehicle. The camera sensor 16b recognizes a right traffic lane line and a left traffic lane line (for example, a right white line and a left white line) that define a lane, based on the image data. The camera sensor 16b computes a parameter indicating the shape of a driving lane (for example, a curvature), a parameter indicating a location relation between the vehicle and a driving lane, and the like. A parameter indicating a location relation between the vehicle and a driving lane includes, for example, a distance between a center position of the vehicle in a vehicle width direction and a selected location on a right white line or a left white line. Various pieces of information (including image data) acquired by the camera sensor 16b are referred to as lane information. The camera sensor 16b may be configured to determine whether there is a target and compute target information, based on image data.

The surrounding sensor 16 outputs information on a situation around the vehicle, including target information and lane information, to the driving support ECU 10 as vehicle surrounding information. The surrounding sensor 16 may be referred to as an information acquisition device that acquires vehicle surrounding information.

The engine ECU 20 is connected to a drive device 21. The drive device 21 generates driving force for driving the wheels Wfr, Wfl, Wrr, Wrl. The drive device 21 includes an engine actuator 22 and an internal combustion engine 23. The engine actuator 22 includes a throttle valve actuator that changes the opening degree of a throttle valve of the internal combustion engine 23. The engine ECU 20 is capable of changing a torque generated by the internal combustion engine 23 by driving the engine actuator 22. A torque generated by the internal combustion engine 23 is transmitted to drive wheels (part or all of the wheels) via a powertrain (transmission) (not shown). Therefore, the engine ECU 20 is capable of controlling the driving force of the vehicle VA to change the status of acceleration (acceleration) by controlling the engine actuator 22. The vehicle VA may include an electric motor as a vehicle driving source instead of or in addition to the internal combustion engine 23. In this case, the engine ECU 20 is capable of controlling the driving force of the vehicle VA by changing a torque generated by the internal combustion engine and/or the electric motor.

The brake ECU 30 is connected to a braking device 31. The braking device 31 is capable of applying a braking force to each of the wheels Wfr, Wfl, Wrr, Wrl. More specifically, the braking device 31 includes a brake actuator 32, wheel cylinders 33 (33fr, 33fl, 33rr, 33rl), and the like. The brake actuator 32 adjusts hydraulic pressures respectively supplied to the wheel cylinders 33 in accordance with instructions from the brake ECU 30. With the hydraulic pressure, each wheel cylinder 33 generates a frictional braking force for a corresponding one of the wheels. Therefore, the brake ECU 30 is capable of controlling the braking force of the vehicle VA to change the status of acceleration (deceleration, that is, negative acceleration) by controlling the brake actuator 32.

The brake ECU 30 receives an output signal from each wheel speed sensor 13 and computes the wheel speed Vw[] of the wheel in accordance with the following expression (1). In the expression (1), r[] is the dynamic radius of each wheel (tire), and, here, r is constant. ω[**] is the angular velocity of each wheel. Hereinafter, the wheel speeds of the right front wheel Wfr, the left front wheel Wfl, the right rear wheel Wrr, and the left rear wheel Wrl are respectively referred to as wheel speeds Vwfr, Vwfl, Vwrr, Vwrl.

$$Vw[]=r \cdot \omega[] \qquad (1)$$

An operation switch 40 is a switch that is operated by a driver when ACC is started or stopped. When the operation switch 40 is switched from an off state to an on state, the driving support ECU 10 starts ACC. When the operation switch 40 is switched from the on state to the off state, the driving support ECU 10 stops ACC.

Outline of ACC

The driving support ECU 10 is configured to execute ACC as one mode of driving support control (see, for example, Japanese Unexamined Patent Application Publication No. 2014-148293 (JP 2014-148293 A), Japanese Unexamined Patent Application Publication No. 2006-315491 (JP 2006-315491 A), the specification of Japanese Patent No. 4172434 (JP 4172434 B), and the like).

ACC is to change the acceleration of the vehicle VA by controlling at least one of the drive device 21 and the braking device 31 based on vehicle surrounding information. The ACC includes two types of control, that is, preceding vehicle following control and constant speed running control. The preceding vehicle following control is to cause the vehicle VA to follow a preceding vehicle (target vehicle to follow) while maintaining an inter-vehicle distance between the target vehicle to follow and the vehicle VA at a target inter-vehicle distance Dset without requiring any operation of the accelerator pedal 11a or the brake pedal 12a. The target vehicle to follow is a vehicle running just ahead of the vehicle VA in an area ahead of the vehicle VA. The constant speed running control is to cause the vehicle VA to run at a target speed (set speed) Vset without requiring any operation of the accelerator pedal 11a or the brake pedal 12a.

When the operation switch 40 is set to the on state, the driving support ECU 10 determines whether there is a target vehicle to follow based on target information. When the driving support ECU 10 determines that there is a target vehicle to follow (a), the driving support ECU 10 executes preceding vehicle following control.

Specifically, the driving support ECU 10 computes a target inter-vehicle distance Dset by multiplying a target inter-vehicle time tw by a vehicle speed SPD. The target inter-vehicle time tw is set by using an inter-vehicle time switch (not shown). The driving support ECU 10 computes a target acceleration Gtgt1 in accordance with any one of the following expression (2) and expression (3). The target acceleration Gtgt1 is referred to as first target acceleration.

$$Gtgt1 \text{(for acceleration)} = ka1 \cdot (k1 \cdot \Delta D1 + k2 \cdot Vfx(a)) \qquad (2)$$

$$Gtgt1 \text{(for deceleration)} = kd1 \cdot (k1 \cdot \Delta D1 + k2 Vfx(a)) \qquad (3)$$

In the expression (2) and the expression (3), Vfx(a) is a relative velocity of the target vehicle to follow (a), k1 and k2 are predetermined positive gains (coefficients), and ΔD1 is an inter-vehicle deviation obtained by subtracting the target inter-vehicle distance Dset from a distance Dfx(a) between the vehicle VA and the target vehicle to follow (a) (that is, an inter-vehicle distance). The driving support ECU 10 determines the first target acceleration Gtgt1 by using the expression (2) when the value (k1·ΔD1+k2·Vfx(a)) is positive or zero. ka1 is a positive gain (coefficient) for acceleration and is set to a value less than or equal to one. The driving support ECU 10 determines the first target acceleration Gtgt1 by using the expression (3) when the value (k1•ΔD1+k2•Vfx(a)) is negative. kd1 is a positive gain (coefficient) for deceleration and is set to one in this example.

The driving support ECU 10 controls the engine actuator 22 by using the engine ECU 20 and, where necessary, controls the brake actuator 32 by using the brake ECU 30 such that the acceleration of the vehicle VA coincides with the first target acceleration Gtgt1.

In contrast, when the driving support ECU 10 determines that there is no target vehicle to follow, the driving support ECU 10 executes constant speed running control. The driving support ECU 10 computes a first target acceleration Gtgt1 based on a vehicle speed SPD at the current point in time and a target speed Vset such that the vehicle speed SPD coincides with the target speed Vset. When, for example, the vehicle speed SPD is lower by a predetermined value (>0) or more than the target speed Vset, the driving support ECU 10 sets the first target acceleration Gtgt1 to a predetermined positive acceleration. When the vehicle speed SPD is higher by a predetermined value (>0) or more than the target speed Vset, the driving support ECU 10 sets the first target acceleration Gtgt1 to a predetermined negative acceleration. The target speed Vset is set by using a target speed setting switch (not shown). The driving support ECU 10 controls the engine actuator 22 by using the engine ECU 20 and, where necessary, controls the brake actuator 32 by using the brake ECU 30 such that the acceleration of the vehicle VA coincides with the first target acceleration Gtgt1.

Outline of ABS

The brake ECU 30 is configured to execute known ABS. ABS is to, when at least specific one wheel of the wheels Wfr, Wfl, Wrr, Wrl locks up in a situation in which a braking force is being applied to the wheels Wfr, Wfl, Wrr, Wrl by the braking device 31 (during braking), release the locking up of the at least specific one wheel by adjusting braking pressure (that is, frictional braking force) to the at least one specific wheel by means of controlling the braking device 31.

The brake ECU 30 computes the slip ratio S1[] of each wheel by using a known technique each time a predetermined time elapses. For example, the slip ratio S1[] is one of values indicating the degree of slip of a wheel and is also referred to as slip relevant value. The slip ratio S1[] is obtained by the following expression (4). Vb is a vehicle body speed. For example, during braking, a maximum value of a plurality of wheel speeds Vw[] is employed as the vehicle body speed Vb.

$$S1[]=((Vb-Vw[])/Vb) \times 100(\%) \quad (4)$$

The brake ECU 30 determines whether an ABS start condition is satisfied for each wheel. The ABS start condition is satisfied when the slip ratio S1[] exceeds a predetermined first slip threshold (threshold for determining whether to start ABS) Sth1. The brake ECU 30 determines the wheel of which the slip ratio S1[] exceeds the first slip threshold Sth1 as an ABS controlled wheel Wi. The suffix "i" is any one of fr, fl, rr, and rl. Then, the brake ECU 30 starts ABS over the ABS controlled wheel Wi.

ABS includes control in pressure reduction mode and control in pressure increasing mode. Hereinafter, the pressure reduction mode and the pressure increasing mode are collectively referred to as ABS mode. When the brake ECU 30 starts ABS, the brake ECU 30 initially executes control in pressure reduction mode. Specifically, the brake ECU 30 reduces the braking pressure of a wheel cylinder 33i associated with an ABS controlled wheel Wi in a predetermined first period by controlling the brake actuator 32. For example, the brake ECU 30 reduces the braking pressure of the wheel cylinder 33i by a predetermined first braking pressure. Thus, the braking force being applied to the ABS controlled wheel Wi decreases, with the result that the slip ratio S1i of the ABS controlled wheel Wi gradually reduces.

Next, the brake ECU 30 executes control in pressure increasing mode. Specifically, the brake ECU 30 increases the braking pressure of the wheel cylinder 33i associated with the ABS controlled wheel Wi in a predetermined second period by controlling the brake actuator 32. For example, the brake ECU 30 increases the braking pressure of the wheel cylinder 33i to a braking pressure corresponding to a required braking force. The magnitude of a rate of increase in braking pressure in pressure increasing mode is less than the magnitude of a rate of reduction in braking pressure in pressure reduction mode. After that, the brake ECU 30 alternately executes control in pressure reduction mode and control in pressure increasing mode. The brake ECU 30 may execute control in holding mode between control in pressure reduction mode just after the start of ABS and subsequent control in pressure increasing mode. In holding mode, braking pressure is held for a third period.

When a predetermined ABS stop condition is satisfied, the brake ECU 30 stops ABS. For example, the ABS stop condition is satisfied when the slip ratio S1i of an ABS controlled wheel Wi is less than a predetermined second slip threshold Sth2 (threshold for determining whether to stop ABS). The second slip threshold Sth2 is less than the first slip threshold Sth1. Alternatively, the brake ECU 30 may determine that the ABS stop condition is satisfied when the duration of the state where the slip ratio S1i of an ABS controlled wheel Wi is less than the second slip threshold Sth2 is longer than or equal to a predetermined period Tmp.

Control when ABS is Started During Execution of ACC

Figure 2:
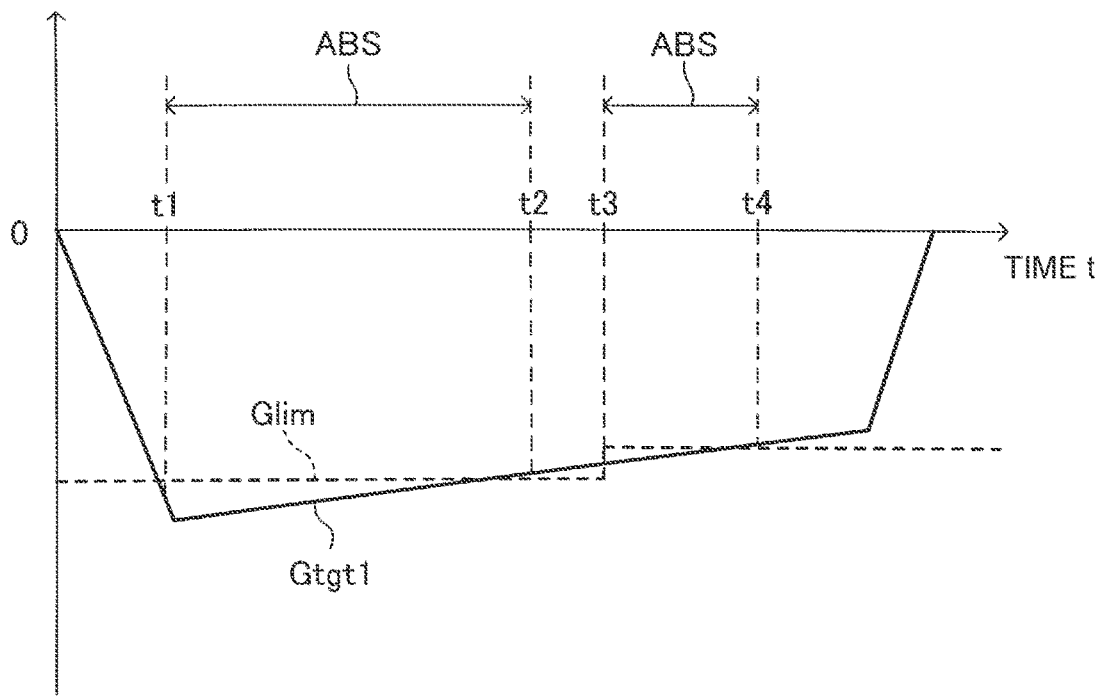
FIG. 2 is a graph showing the relation in time sequence between a first target acceleration and a limit deceleration in the case where anti-skid control (ABS) is started in a situation in which driving support control (ACC) is being executed.

As shown in FIG. 2, it is assumed that, during execution of ACC, a situation in which the vehicle VA is decelerated at the first target acceleration Gtgt1 (in this example, negative acceleration) has occurred. When the wheel (tire) of the vehicle VA locks up, the wheel slips on a road surface while maintaining the locking-up state. An acceleration at the point in time at which the wheel begins to slip (skid limit) is a limit value of an available negative acceleration (deceleration) on a road surface on which the vehicle VA is running. Hereinafter, the limit value of the acceleration is referred to as limit deceleration. In FIG. 2, Glim denotes a limit deceleration.

A limit deceleration Glim depends on the road surface μ between each wheel (tire) of the vehicle VA and a road surface on which the vehicle VA is running. For example, the limit deceleration Glim is obtained by the following expression (5). g is a gravitational acceleration.

$$Glim = \mu \cdot g \quad (5)$$

In the example shown in FIG. 2, at time t1, the first target acceleration Gtgt1 is less than the limit deceleration Glim. Therefore, at time t1, the wheel W[] locks up, and the wheel W[] begins to slip on the road surface. Since the slip ratio S1[] exceeds the first slip threshold Sth1 at time t1, ABS is started for the wheel W[]. After that, when the first target acceleration Gtgt1 exceeds the limit deceleration Glim at time t2, the slip ratio S1[**] is less than the second slip threshold Sth2. Thus, ABS is stopped at time t2.

In the example shown in FIG. 2, the road surface μ reduces just after time t2. Therefore, the limit deceleration Glim changes (the absolute value of the limit deceleration Glim reduces). At time t3, the first target acceleration Gtgt1 is less than the limit deceleration Glim again, and the wheel W[] locks up. Thus, the slip ratio S1[] exceeds the first slip threshold Sth1 again. Thus, ABS is started again at time t3. After that, the first target acceleration Gtgt1 exceeds the limit deceleration Glim at time t4, so ABS is stopped.

In this way, when the road surface µ changes in a situation in which the vehicle VA is decelerated by ACC, ABS is repeatedly executed within a relatively short time. After that, there is a possibility that the behavior of the vehicle VA becomes instable.

Specific Process

When ABS is started during execution of ACC, the driving support ECU 10 executes a specific process that will be described below.

Specifically, when ABS is started during execution of ACC, the driving support ECU 10 obtains (or estimates) the limit deceleration Glim. As described above, it may be regarded that the acceleration of the vehicle VA has reached the limit deceleration Glim at a point in time at which ABS is started. Then, in this example, the driving support ECU 10 uses the value of the acceleration Ga, acquired by the acceleration sensor 15, as the limit deceleration Glim after the point in time at which ABS is started.

After the start of ABS, the driving support ECU 10 determines whether a predetermined specific process start condition is satisfied. The specific process start condition is satisfied when both the following condition A and condition B are satisfied. Gc1 is a predetermined negative acceleration (deceleration) that is used to determine whether to start the specific process and, in this example, the limit deceleration Glim (that is, Gc1=Glim). Gc1 may be referred to as first deceleration. Gth1 is a predetermined threshold and is a positive value.

$$Gtgt1 < Gc1 < 0 \quad \text{(Condition A)}$$

$$|Gtgt1 - Gc1| < Gth1 \quad \text{(Condition B)}$$

In other words, when the first target acceleration Gtgt1 is less than the first deceleration Gc1 (=Glim) and greater than a value (Gc1−Gth1) obtained by subtracting a value Gth1 from the first deceleration Gc1 (Gc1−Gth1<Gtgt1<Gc1), the specific process start condition is satisfied.

When the first target acceleration Gtgt1 is significantly less than the first deceleration Gc1 (=Glim), even when the absolute value of the limit deceleration Glim reduces due to a change (decrease) in road surface µ, the first target acceleration Gtgt1 is less likely to exceed the limit deceleration Glim. In other words, ABS is less likely to be stopped. On the other hand, when the road surface µ changes in a situation in which the magnitude (|Gtgt1−Gc1|) of a difference from the first deceleration Gc1 is small, ABS is highly likely to be repeated as shown in FIG. 2. From above, the condition B may be regarded as a condition to determine whether ABS is highly likely to be repeated.

When the driving support ECU 10 determines that the specific process start condition is satisfied, the driving support ECU 10 starts the specific process. The specific process is a process for making the ABS stop condition difficult to be satisfied as compared to when ABS is started in a situation in which ACC is not executed. In other words, the specific process is a process for, when ABS is once started during execution of ACC, not repeating the start and stop of ABS.

Specifically, when the driving support ECU 10 determines that the specific process start condition is satisfied, the driving support ECU 10 computes a second target acceleration Gtgt2, reduced by a predetermined acceleration ΔGd from the first target acceleration Gtgt1, as a final target acceleration. The value ΔGd is a positive value. The second target acceleration Gtgt2 is a target deceleration for the specific process. The driving support ECU 10 controls the brake actuator 32 by using the brake ECU 30 such that the acceleration of the vehicle VA coincides with the second target acceleration Gtgt2.

After a point in time at which the specific process is started, when the driving support ECU 10 determines that the predetermined specific process end condition is satisfied, the driving support ECU 10 ends the specific process by returning the target acceleration from the second target acceleration Gtgt2 to the first target acceleration Gtgt1.

Even after a point in time at which the specific process is started, the driving support ECU 10 uses the value of the acceleration Ga, acquired by the acceleration sensor 15, as the limit deceleration Glim. The driving support ECU 10 determines whether the specific process end condition is satisfied by using the limit deceleration Glim. The specific process end condition is satisfied when both the following condition C and condition D are satisfied. Gc2 is a predetermined negative acceleration (deceleration) that is used to determine whether to end the specific process and, in this example, the limit deceleration Glim (that is, Gc2=Glim). Gc2 may be referred to as second deceleration. Gth2 is a predetermined threshold and is a positive value.

$$Gtgt2 > Gc2 \quad \text{(Condition C)}$$

$$|Gtgt2 - Gc2| > Gth2 \quad \text{(Condition D)}$$

In other words, when the second target acceleration Gtgt2 is greater than a value (Gc2+Gth2) obtained by adding a value Gth2 to the second deceleration Gc2 (=Glim) (Gtgt2>Gc2+Gth2), the specific process end condition is satisfied. According to the condition D, the specific process is continued in accordance with the magnitude of Gth2 after ABS stops. It is possible to start the ABS at early timing in a situation in which at least one wheel is likely to lock up again.

Figure 3:
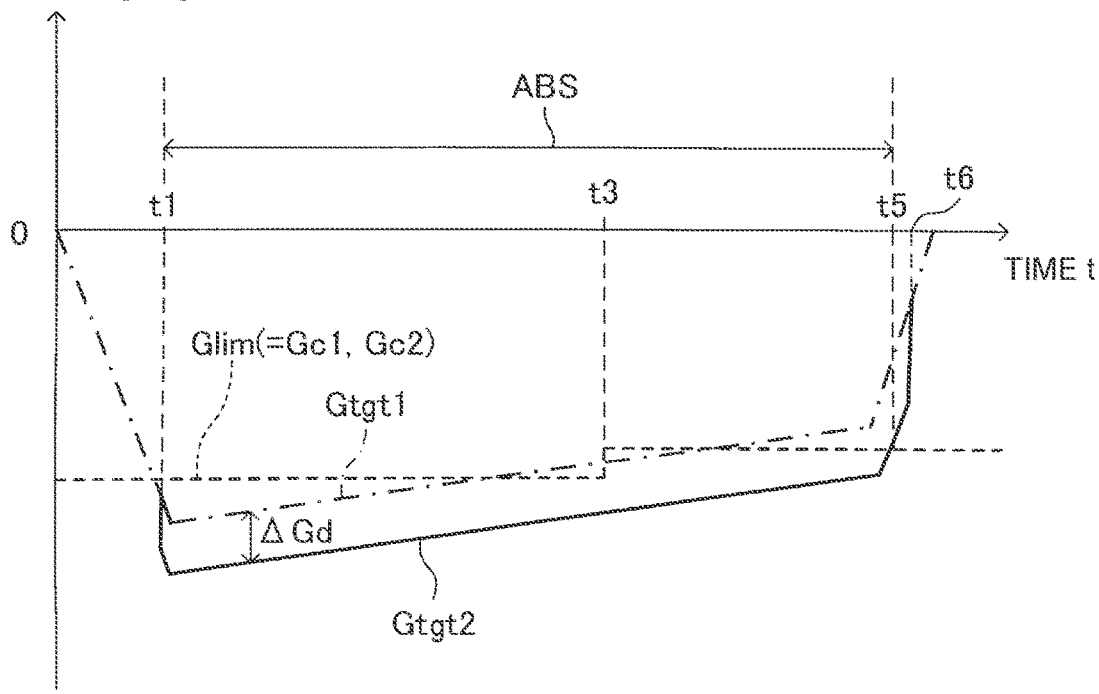
FIG. 3 is a graph showing the relation in time sequence among a first target acceleration, a second target acceleration, and a limit deceleration in the case where anti-skid control (ABS) is started in a situation in which driving support control (ACC) is being executed.

FIG. 3 shows the operation status of the driving support ECU 10 configured to be capable of executing the specific process in the same situation as FIG. 2. Since the slip ratio S1[] exceeds the first slip threshold Sth1 at time t1, ABS is started for the wheel W[].

Since the specific process start condition is satisfied at time t1, the driving support ECU 10 starts computing the second target acceleration Gtgt2 (that is, Gtgt2→Gtgt1−ΔGd). After time t1, the driving support ECU 10 controls the brake actuator 32 by using the brake ECU 30 such that the acceleration of the vehicle VA coincides with the second target acceleration Gtgt2.

As a result, as shown at time t3 in FIG. 3, even when the limit deceleration Glim changes due to a change (decrease) in road surface µ, the state where the second target acceleration Gtgt2 is less than the limit deceleration Glim is maintained. Therefore, the slip ratio S1[] does not becomes less than the second slip threshold Sth2 (that is, the ABS stop condition is not satisfied). Hence, ABS is started at time t1 and then continued until time t5 without interruption. As a result, it is possible to reduce the possibility of instable behavior of the vehicle VA. After that, when the specific process end condition is satisfied at time t6, the driving support ECU 10 ends the specific process. In other words, after time t6, the driving support ECU 10 controls the brake actuator 32 by using the brake ECU 30** such that the acceleration of the vehicle VA coincides with the first target acceleration Gtgt1.

In the example of FIG. 3, the specific process is ended before the first target acceleration Gtgt1 reaches zero from a negative value. In contrast, when the road surface μ is extremely small, there can be a situation in which the specific process is still being executed at a point in time at which the first target acceleration Gtgt1 reaches zero from a negative value. In this case, the driving support ECU 10 may end the specific process at a point in time at which the first target acceleration Gtgt1 reaches zero. Thus, it is possible to prevent unnecessary deceleration of the vehicle VA.

Operation

Next, the operation of the CPU (simply referred to as CPU1) of the brake ECU 30 will be described. The CPU1 is configured to execute an ABS flag setting routine shown by the flowchart in FIG. 4 each time a predetermined time elapses.

The CPU1 acquires an output signal from each wheel speed sensor 13 and computes the slip ratio S1[] in accordance with the expression (4) for each wheel by executing a routine (not shown) each time a predetermined time elapses. The CPU1 also starts or stops ABS based on the slip ratio S1[] by executing the routine (not shown) for each wheel each time a predetermined time elapses.

Figure 4:
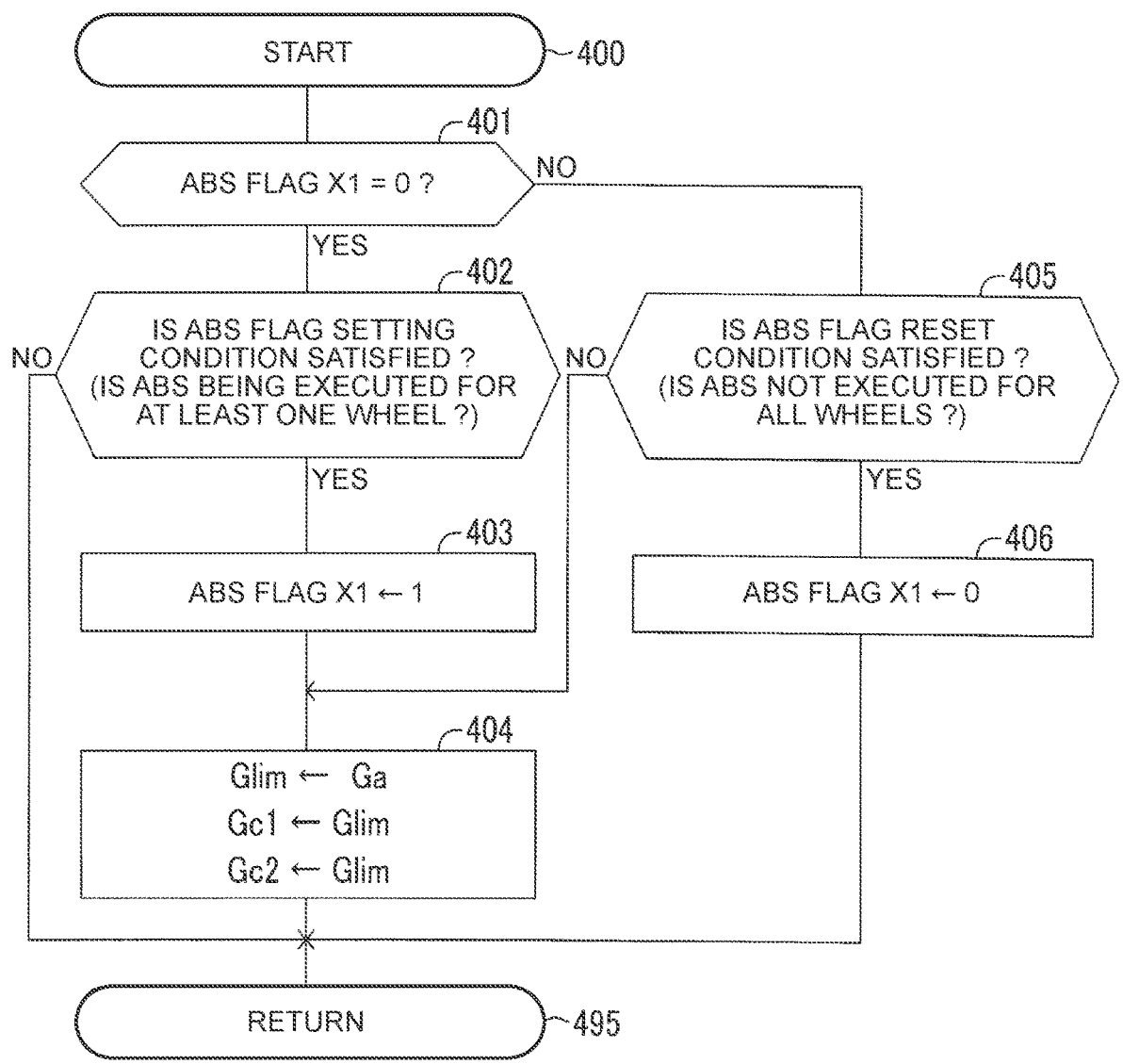
FIG. 4 is a flowchart showing an ABS flag setting routine that is executed by a CPU of a brake ECU.

At predetermined timing, the CPU1 starts the routine of FIG. 4 from step 400, proceeds to step 401, and determines whether an ABS flag X1 is "0". When the value of the ABS flag X1 is "1", it indicates that ABS is being executed for at least one wheel. When the value of the ABS flag X1 is "0", it indicates that ABS is not being executed for all the wheels. The value of the ABS flag X1 (and values X2, X3 of other flags (described later)) is set to "0" in an initialize routine that is executed when an ignition switch (not shown) is changed from OFF position to ON position.

When it is assumed that the value of the ABS flag X1 is "0", the CPU1 makes an affirmative determination in step 401, proceeds to step 402, and determines whether the ABS flag setting condition is satisfied. As described above, the ABS flag setting condition is satisfied when ABS is being executed for at least one wheel.

When the ABS flag setting condition is not satisfied, the CPU1 makes a negative determination in step 402, directly proceeds to step 495, and once ends the routine.

In contrast, when ABS is started for at least one specific wheel, the ABS flag setting condition is satisfied. In this case, the CPU1 makes an affirmative determination in step 402 and sequentially executes the processes of step 403 and step 404 that will be described below. After that, the CPU1 proceeds to step 495 and once ends the routine.

In step 403, the CPU1 sets the value of the ABS flag X1 to "1". The CPU1 sends information on the ABS flag X1 to the driving support ECU 10. In step 404, the CPU1 sets the limit deceleration Glim to the acceleration Ga acquired by the acceleration sensor 15. In addition, the CPU1 sets the first deceleration Gc1 for the limit deceleration Glim and sets the second deceleration Gc2 for the limit deceleration Glim. The CPU1 sends information on the first deceleration Gc1 and the second deceleration Gc2 to the driving support ECU 10.

After the ABS flag X1 is set to "1" as described above, the CPU1 starts the routine of FIG. 4 again from step 400. The CPU1 makes a negative determination in step 401, proceeds to step 405, and determines whether an ABS flag reset condition is satisfied. The ABS flag reset condition is satisfied when ABS is not being executed for all the wheels.

When, for example, ABS for the above-described at least one specific wheel is not stopped, the ABS flag reset condition is not satisfied. In this case, the CPU1 makes a negative determination in step 405 and executes the process of step 404 as described above. After that, the CPU1 proceeds to step 495 and once ends the routine.

In contrast, when ABS for the above at least one specific wheel stops and, as a result, ABS is not executed for all the wheels, the ABS flag reset condition is satisfied. In this case, the CPU1 makes an affirmative determination in step 405, proceeds to step 406, and sets the value of the ABS flag X1 to "0". The CPU1 sends information on the ABS flag X1 to the driving support ECU 10. After that, the CPU1 proceeds to step 495 and once ends the routine.

Figure 5:
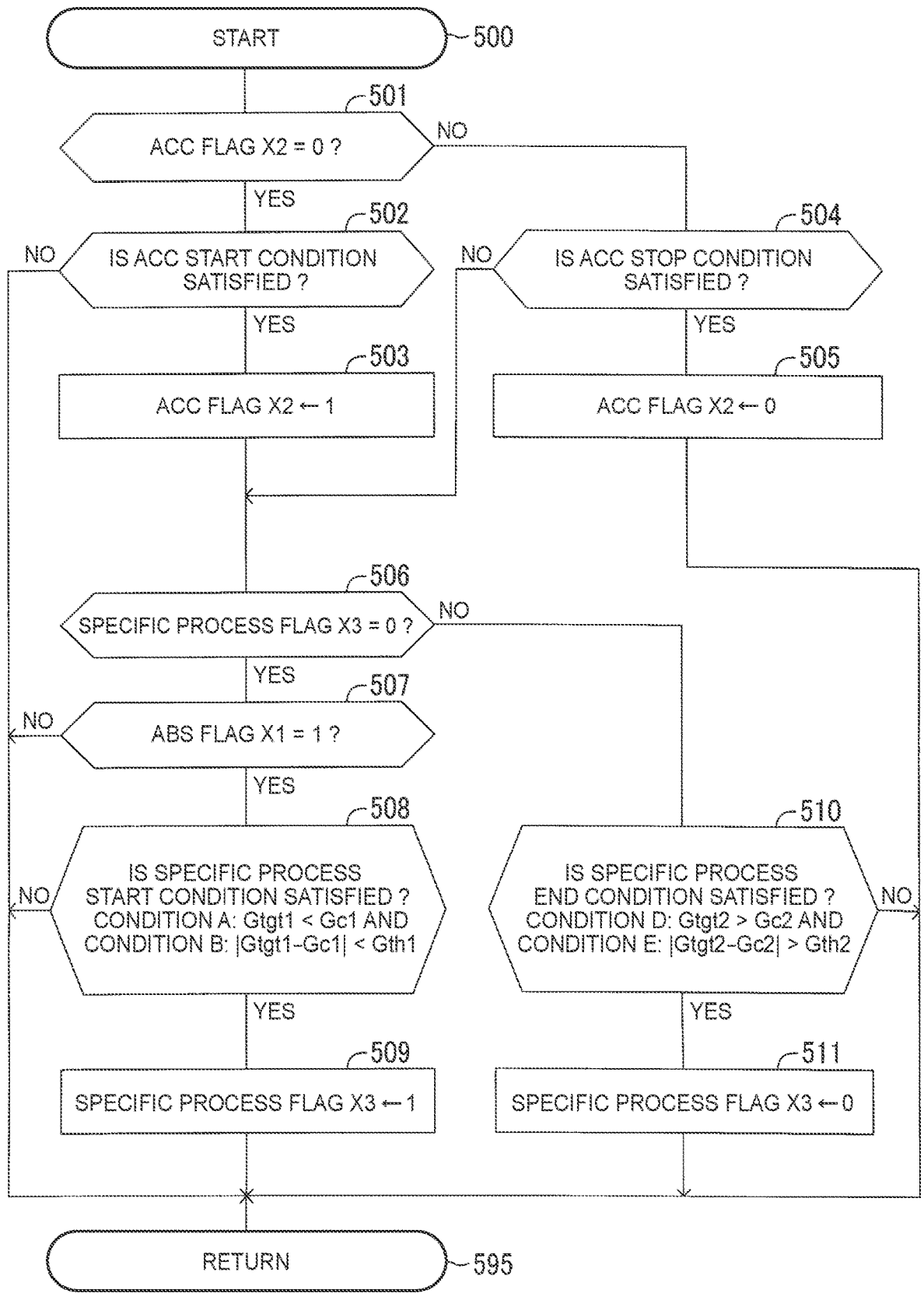
FIG. 5 is a flowchart showing an ACC start/stop routine that is executed by a CPU of a driving support ECU.

Furthermore, a CPU (simply referred to as CPU2) of the driving support ECU 10 is configured to execute an ACC execution routine shown by the flowchart of FIG. 5 each time a predetermined time elapses.

The CPU2 acquires detection signals or output signals from the various sensors 11, 12, 13, 14, 15, 16, and the operation switch 40 by executing a routine (not shown) each time a predetermined time elapses, and stores these signals in the RAM of the driving support ECU 10. In addition, the CPU2 acquires the above-described pieces of information (including the ABS flag X1, the first deceleration Gc1, and the second deceleration Gc2) from the brake ECU 30 by executing a routine (not shown) each time a predetermined time elapses.

At predetermined timing, the CPU2 starts the process from step 500 of FIG. 5, proceeds to step 501, and determines whether the value of the ACC flag X2 is "0". When the value of the ACC flag X2 is "1", it indicates that ACC is being executed. When the value of the ACC flag X2 is "0", it indicates that ACC is not being executed.

When it is assumed that the value of the ACC flag X2 is "0" (ACC is not being executed), the CPU2 makes an affirmative determination in step 501, proceeds to step 502, and determines whether an ACC start condition is satisfied. The ACC start condition is satisfied when the operation switch 40 is set in an on state (that is, when execution of ACC is required). Further another condition (for example, a condition in which the vehicle speed SPD is higher than or equal to a predetermined speed threshold Vth) may be added as one of conditions to be satisfied to satisfy the ACC start condition. This also applies to the other conditions described in the specification.

When the ACC start condition is not satisfied, the CPU2 makes a negative determination in step 502 and directly proceeds to step 595, and once ends the routine.

In contrast, when the ACC start condition is satisfied, the CPU2 makes an affirmative determination in step 502, proceeds to step 503, and sets the value of the ACC flag X2 to "1". Thus, the CPU2 makes an affirmative determination in step 601 of the routine in FIG. 6 (described later), so ACC is started.

Subsequently, the CPU2 proceeds to step 506 and determines whether the value of a specific process flag X3 is "0". When the value of the specific process flag X3 is "1", it indicates that the specific process is being executed. When the value of the specific process flag X3 is "0", it indicates that the specific process is not being executed.

When it is assumed that the value of the specific process flag X3 is "0" (the specific process is not being executed), the CPU2 makes an affirmative determination in step 506, proceeds to step 507, and determines whether the value of the ABS flag X1 is "1". When the value of the ABS flag X1 is not "1", the CPU2 makes a negative determination in step 507 and directly proceeds to step 595, and once ends the routine.

After ACC is started as described above, the CPU2 starts the routine of FIG. 5 again from step 500. Since the value of the ACC flag X2 is "1", the CPU2 makes a negative determination in step 501, proceeds to step 504, and determines whether an ACC end condition is satisfied. The ACC end condition is satisfied when the operation switch 40 is set to an off state.

When the ACC end condition is satisfied, the CPU2 makes an affirmative determination in step 504, proceeds to step 505, and sets the value of the ACC flag X2 to "0". After that, the CPU2 proceeds to step 595 and once ends the routine. Thus, the CPU2 makes a negative determination in step 601 of the routine in FIG. 6 (described later), so ACC is stopped.

In contrast, when the ACC end condition is not satisfied, the CPU2 makes a negative determination in step 504 and proceeds to step 507 via step 506. When it is assumed that ABS is started for one wheel, the value of the ABS flag X1 is "1". The CPU2 makes an affirmative determination in step 507, proceeds to step 508, and determines whether the specific process start condition is satisfied. In other words, the CPU2 determines whether both the above-described condition A and condition B are satisfied.

When the specific process start condition is not satisfied, the CPU2 makes a negative determination in step 508, directly proceeds to step 595, and once ends the routine.

In contrast, when the specific process start condition is satisfied, the CPU2 makes an affirmative determination in step 508, proceeds to step 509, and sets the value of the specific process flag X3 to "1". After that, the CPU2 proceeds to step 595 and once ends the routine. Thus, the CPU2 makes a negative determination in step 603 of the routine in FIG. 6 (described later), so the specific process is started.

After the specific process is started as described above, the CPU2 starts the routine of FIG. 5 from step 500 again and proceeds to step 506 via step 501 and step 504. The CPU2 makes a negative determination in step 506, proceeds to step 510, and determines whether the specific process end condition is satisfied. In other words, the CPU2 determines whether both the above-described condition C and condition D are satisfied. When the specific process end condition is not satisfied, the CPU2 makes a negative determination in step 510, directly proceeds to step 595, and ends the routine.

In contrast, when the specific process end condition is satisfied, the CPU2 makes an affirmative determination in step 510, proceeds to step 511, and sets the value of the specific process flag X3 to "0". After that, the CPU2 proceeds to step 595 and once ends the routine. Thus, the CPU2 makes an affirmative determination in step 603 of the routine in FIG. 6 (described later), so the specific process is ended.

Figure 6:
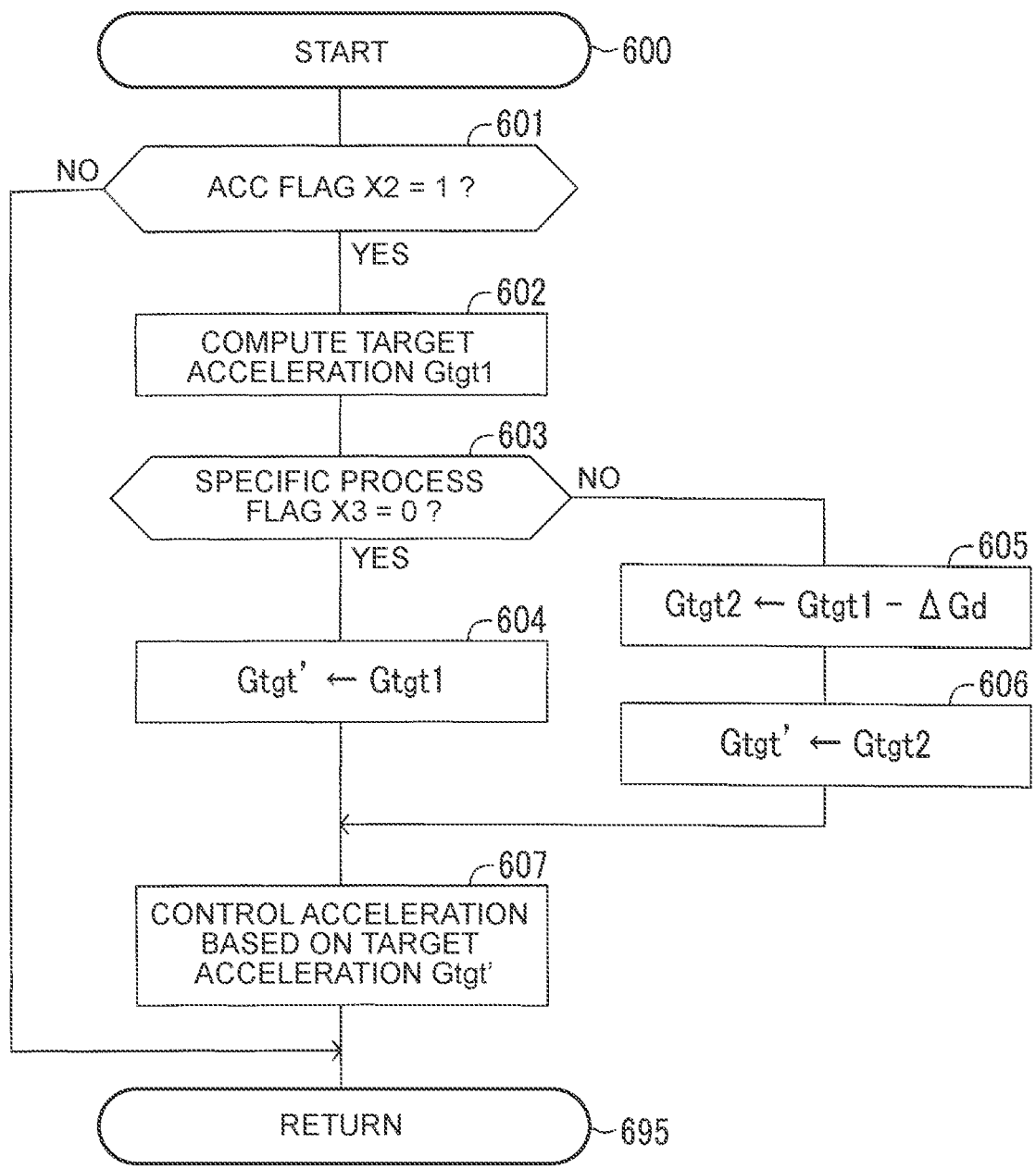
FIG. 6 is a flowchart showing an ACC routine that is executed by the CPU of the driving support ECU.

Furthermore, the CPU2 is configured to execute the ACC execution routine shown by the flowchart of FIG. 6 each time a predetermined time elapses.

At predetermined timing, the CPU2 starts the process from step 600 of FIG. 6, proceeds to step 601, and determines whether the value of the ACC flag X2 is "1". When the value of the ACC flag X2 is not "1", the CPU2 makes a negative determination in step 601, directly proceeds to step 695, and once ends the routine.

In contrast, when the value of the ACC flag X2 is "1", the CPU2 makes an affirmative determination in step 601, proceeds to step 602, and computes the first target acceleration Gtgt1 as described above. Subsequently, the CPU2 proceeds to step 603 and determines whether the value of the specific process flag X3 is "0". When the value of the specific process flag X3 is "0", the CPU2 makes an affirmative determination in step 603 and sequentially executes the processes of step 604 and step 607 that will be described below. After that, the CPU2 proceeds to step 695 and ends the routine.

In step 604, the CPU2 sets a final target acceleration Gtgt' to the first target acceleration Gtgt1. In step 607, the CPU2 controls the acceleration of the vehicle VA such that the acceleration of the vehicle VA coincides with the target acceleration Gtgt'.

In contrast, when the value of the specific process flag X3 is not "0", the CPU2 executes the specific process. In other words, the CPU2 makes a negative determination in step 603 and sequentially executes the processes of step 605, step 606, and step 607 that will be described below. After that, the CPU2 proceeds to step 695 and ends the routine.

In step 605, the CPU2 computes the second target acceleration (target deceleration for the specific process) Gtgt2 as described above based on the first target acceleration Gtgt1 (that is, Gtgt2→Gtgt1−ΔGd). In step 606, the CPU2 sets the final target acceleration Gtgt' to the second target acceleration Gtgt2. In step 607, the CPU2 controls the acceleration of the vehicle VA such that the acceleration of the vehicle VA coincides with the target acceleration Gtgt' (in this case, the brake actuator 32 is controlled by using the brake ECU 30).

With the above configuration, when ABS is started in a situation in which ACC is being executed, even when the limit deceleration Glim changes due to a decrease in road surface μ, the state where the second target acceleration Gtgt2 is less than the limit deceleration Glim is maintained for a relatively long time. Because the ABS stop condition is difficult to be satisfied, ABS is continued without interruption. Therefore, the possibility of instable behavior of the vehicle VA is reduced.

The disclosure is not limited to the above-described embodiment, and various modifications may be employed within the scope of the disclosure.

Modification 1

Figure 7:
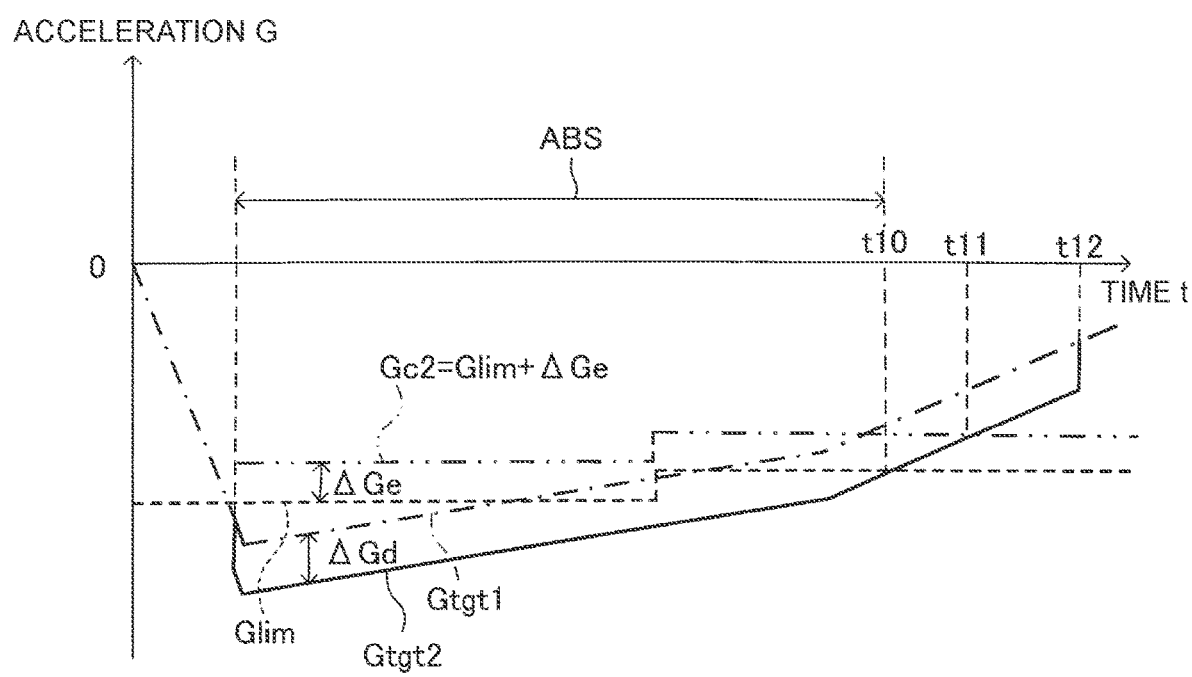
FIG. 7 is a graph showing the relationship among a first target acceleration, a second target acceleration, a limit deceleration, and a second deceleration in time sequence according to a modification.

The first deceleration Gc1 and the second deceleration Gc2 are not limited to the above-described example. For example, the first deceleration Gc1 may be the limit deceleration Glim, and the second deceleration Gc2 may be a value greater by a predetermined acceleration ΔGe than the limit deceleration Glim. As shown in FIG. 7, when the second deceleration Gc2 is the limit deceleration Glim, ABS is stopped at time t10, and then the specific process is ended at time t11. In contrast, when the second deceleration Gc2 is Glim+ΔGe, the specific process is ended at time t12. According to this modification, after time t10 at which ABS is stopped, the specific process is executed for a period longer than that of the above-described embodiment. In a situation in which at least one wheel is likely to lock up again, it is possible to start ABS at timing earlier than that of the above-described embodiment. Thus, it is possible to further early stabilize the behavior of the vehicle VA.

Modification 2

A method of determining the second target acceleration (target deceleration for the specific process) Gtgt2 is not limited to the above-described example. For example, the driving support ECU 10 sets an acceleration reduced by an acceleration Gh from the first target acceleration Gtgt1 as the second target acceleration Gtgt2 (that is, Gtgt2→Gtgt1−Gh). The driving support ECU 10 sets the acceleration Gh to zero at a point in time at which the specific process start condition is satisfied, and gradually increases the acceleration Gh with time. When the acceleration Gh reaches ΔGd, the driving support ECU 10 maintains the acceleration Gh at ΔGd. With this configuration, the value of the second target acceleration Gtgt2 gradually approaches Gtgt1−ΔGd. Thus, the ABS stop condition is difficult to be satisfied.

In another example, the driving support ECU 10 may obtain the second target acceleration Gtgt2 less by a positive predetermined amount than the first target acceleration Gtgt1 by applying the limit deceleration Glim (or road surface μ), the vehicle speed SPD, and the first target acceleration Gtgt1 to a predetermined map MP(Glim, SPD, Gtgt1).

The first target acceleration at a point in time at which the specific process start condition is satisfied is represented by Gtgt1'. Gtgt1' is less than the limit deceleration Gtgt. Therefore, the driving support ECU 10 may set the second target acceleration Gtgt2 to Gtgt1' at a point in time at which the specific process start condition is satisfied, and may maintain the second target acceleration Gtgt2 (=Gtgt1') for a predetermined period Tph. At a point in time at which the predetermined period Tph has elapsed from the point in time at which the specific process start condition is satisfied, the driving support ECU 10 may set the second target acceleration Gtgt2 to the first target acceleration Gtgt1 at that point in time.

Modification 3

The specific process end condition is not limited to the above-described example. In one example, the condition D may be omitted from the specific process end condition. With this configuration, when the second target acceleration Gtgt2 exceeds the second deceleration Gc2 (=Glim or Glim+ΔGe), the driving support ECU 10 ends the specific process.

In another example, the specific process end condition may be satisfied when the following condition E is satisfied. (Condition E): An elapsed time Tep from a point in time at which the value of the ABS flag X1 becomes "0" (point in time at which ABS is stopped) reaches a predetermined time threshold Tth.

Modification 4

When the specific process end condition is satisfied, the driving support ECU 10 may gradually reduce the value of the second target acceleration Gtgt2 toward the first target acceleration Gtgt1.

Modification 5

The specific process is not limited to the above-described example. The driving support ECU 10 may execute a process of setting the second slip threshold Sth2, which is used when ACC is being executed, such that the second slip threshold Sth2 is less than that when ACC is not being executed, as the specific process. When ACC is not being executed, the second slip threshold Sth2 is set to a first value Sa (standard value). When the specific process start condition is satisfied in a situation in which ACC is being executed, the driving support ECU 10 sets the second slip threshold Sth2 to a second value Sb. The second value Sb is less than the first value Sa. Thus, ABS becomes difficult to be stopped.

The present modification differs from the above-described embodiment in that the CPU2 of the driving support ECU 10 executes the routine of FIG. 8 instead of the routine of FIG. 5. In addition, the CPU2 executes a routine that is the routine of FIG. 6, excluding step 603, step 605, and step 606.

The routine shown in FIG. 8 is a routine obtained by replacing step 509, step 510, and step 511 with step 801, step 802, and step 803. Among steps shown in FIG. 8, like reference signs to those assigned in FIG. 5 are assigned to steps in which the same processes as those of steps shown in FIG. 5 are executed. The detailed description of those steps is omitted.

When the CPU2 determines in step 508 of the routine in FIG. 8 that the specific process start condition is satisfied, the CPU2 proceeds to step 801. In step 801, the CPU2 sets the value of the specific process flag X3 to "1" and sets the second slip threshold Sth2 to the second value Sb.

After that, the CPU2 starts the routine of FIG. 8 from step 800 and proceeds to step 802 via step 501, step 504, and step 506. The CPU2 determines in step 802 whether the specific process end condition is satisfied. In this example, the specific process end condition is satisfied when the value of the ABS flag X1 is "0". When the specific process end condition is satisfied, the CPU2 makes an affirmative determination in step 802 and proceeds to step 803. In step 803, the CPU2 sets the value of the specific process flag X3 to "0" and sets the second slip threshold Sth2 to the first value Sa.

According to the present modification, when ABS is started during execution of ACC, the ABS stop condition is more difficult to be satisfied than that when ABS is started in a situation in which ACC is not being executed. Since ABS is continued without interruption, it is possible to reduce the possibility of instable behavior of the vehicle VA.

Modification 6

The driving support ECU 10 may estimate a limit deceleration Glim from the road surface μ of a road surface on which the vehicle is running after a point in time at which ABS is started. For example, the driving support ECU 10 estimates a road surface μ after a point in time at which ABS is started and computes a limit deceleration Glim in accordance with the expression (5) based on the estimated road surface μ. The driving support ECU 10 may set such an estimated value of the limit deceleration Glim as the first deceleration Gc1 and the second deceleration Gc2 (that is, Gc1→Glim, Gc2→Glim).

A road surface μ may be estimated in accordance with one of various known techniques. For example, the driving support ECU 10 may estimate a road surface μ based on image data acquired by the camera sensor 16b (see, for example, Japanese Unexamined Patent Application Publication No. 2005-149021 (JP 2005-149021 A)). A road surface μ reduces when a road surface is wet. The brightness of pixels of a road surface in image data increases when a road surface is wet. Therefore, the driving support ECU U 10 may obtain the brightness of pixels of a road surface and estimate a road surface μ such that the road surface μ reduces as the brightness increases.

Modification 7

When the specific process start condition is satisfied, the brake ECU 30 may execute a process of controlling the braking device 31 based on the second target acceleration Gtgt2 as the specific process. For example, the brake ECU 30 acquires information of the second target acceleration Gtgt2 from the driving support ECU 10. When the pressure increasing mode is executed as the ABS mode, the brake ECU 30 executes control in pressure increasing mode such that the braking pressure of the wheel cylinder 33$i$ of an ABS controlled wheel Wi becomes a braking pressure corresponding to the second target acceleration Gtgt2. With this configuration as well, the braking device 31 is controlled based on the second target acceleration Gtgt2 less than the limit deceleration Glim. Thus, ABS becomes difficult to be stopped. It is possible to reduce the possibility of instable behavior of the vehicle VA.

Modification 8

The slip relevant value is not limited to the above-described slip ratio S1. If, for example, the slip relevant value increases as the degree of slip increases, the slip relevant value may be computed in accordance with an expression other than the expression (4). For example, a wheel speed difference from a maximum value of the plurality of wheel speeds Vw and/or a slip ratio rate (the amount of change in slip ratio S1 per unit time) may be employed as the slip relevant value. For example, the brake ECU 30 may compute a wheel speed difference $\Delta Vd[]$ from a maximum value among the plurality of wheel speeds Vw as a slip relevant value for each wheel. The brake ECU 30 may start ABS when the magnitude ($|\Delta Vd[]|$) of the wheel speed difference exceeds a predetermined first speed difference threshold Svth1. When the magnitude ($|\Delta Vd[]|$) of the wheel speed difference becomes less than a second speed difference threshold Svth2, the brake ECU 30 may stop ABS. The second speed difference threshold Svth2 is less than the first speed difference threshold Svth1. The driving support ECU 10** may set the second speed difference threshold Svth2 used when ACC is being executed such that the second speed difference threshold Svth2 is less than Svth2 used when ACC is not being executed.

Modification 9

The above-described configuration is not limited to ACC and may be applied to a vehicle control system that executes autonomous driving control that autonomously controls the acceleration, steering angle, and the like of a vehicle (control having higher autonomous driving level than ACC).

What is claimed is:

1. A vehicle control system comprising:

a motor that generates a driving force that drives one or more wheels;

one or more brakes that respectively apply a braking force to each of the one or more wheels;

one or more sensors that acquire vehicle surrounding information that is information on a situation around a vehicle; and a controller that executes:

driving support control to compute a target acceleration based on the vehicle surrounding information and change an acceleration of the vehicle by using at least one of the motor and the one or more brakes such that an actual acceleration of the vehicle coincides with the target acceleration, and anti-skid control to, when at least one specific wheel of the one or more wheels locks up in a situation in which the braking force is being applied to the one or more wheels by the one or more brakes, adjust the braking force applied to the at least one specific wheel by using the one or more brakes such that the locking up of the at least one specific wheel is released, wherein:

the controller is configured to:

when a start condition including a condition that a slip relevant value indicating a degree of slip of the at least one specific wheel is greater than a predetermined start threshold is satisfied, start the anti-skid control on the at least one specific wheel;

when the anti-skid control is started when driving support control is not being executed, stop the anti-skid control when a first stop condition including a condition that the slip relevant value of the at least one specific wheel is less than a first predetermined stop threshold value is satisfied; and when the anti-skid control is started when the driving support control is being executed, execute a specific process that includes stopping the anti-skid control when a second stop condition including a condition that the slip relevant value of the at least one specific wheel is less than a second predetermined stop threshold value is satisfied, the second predetermined stop threshold value being less than the first predetermined stop threshold value.

2. The vehicle control system according to claim 1, wherein:

the controller is configured to, after when the anti-skid control is started, estimate a limit deceleration that is a limit value of an available negative acceleration on a road surface on which the vehicle is running; and the controller is configured to, when the target acceleration is less than the limit deceleration and a magnitude of a difference between the target acceleration and the limit deceleration is less than a predetermined first threshold, start the specific process.

3. A vehicle control system comprising:

a motor that generates a driving force that drives one or more wheels;

one or more brakes that respectively apply a braking force to each of the one or more wheels;

one or more sensors that acquire vehicle surrounding information that is information on a situation around a vehicle; and a controller that executes:

driving support control to compute a target acceleration based on the vehicle surrounding information and change an acceleration of the vehicle by using at least one of the motor and the one or more brakes such that an actual acceleration of the vehicle coincides with the target acceleration, and anti-skid control to, when at least one specific wheel of the one or more wheels locks up in a situation in which the braking force is being applied to the one or more wheels by the one or more brakes, adjust the braking force applied to the at least one specific wheel by using the one or more brakes such that the locking up of the at least one specific wheel is released, wherein:

the controller is configured to:

when a start condition including a condition that a slip relevant value indicating a degree of slip of the at least one specific wheel is greater than a predetermined start threshold is satisfied, start the anti-skid control on the at least one specific wheel;

when the anti-skid control is started when driving support control is not being executed, stop the anti-skid control when a first stop condition including a condition that the slip relevant value of the at least one specific wheel is less than a predetermined stop threshold value is satisfied; and when the anti-skid control is started when driving support control is being executed, execute a specific process that includes controlling the one or more brakes based on a target deceleration that is an acceleration obtained by reducing the target acceleration by a predetermined amount.

4. The vehicle control system according to claim 3, wherein:
the controller is configured to, from when the specific process is started,
estimate a limit deceleration that is a limit value of an available negative acceleration on a road surface on which the vehicle is running; and
when the target deceleration exceeds the limit deceleration, stop the specific process.

5. The vehicle control system according to claim 3, wherein:
the controller is configured to, from when the specific process is started,
estimate a limit deceleration that is a limit value of an available negative acceleration on a road surface on which the vehicle is running; and
when the target deceleration exceeds a value greater by a predetermined value than the limit deceleration, stops the specific process.

* * * * *